United States Patent
Iwema et al.

(10) Patent No.: US 7,221,376 B2
(45) Date of Patent: May 22, 2007

(54) SPACE TOOL FEEDBACK BY CHANGING THE DISPLAYED VISUAL APPEARANCE OF OBJECTS TO BE MOVED BEFORE DELETION OF DISPLAYED OBJECTS OCCURS

(75) Inventors: Marieke Iwema, Seattle, WA (US); Emily K. Rimas, Seattle, WA (US); F. David Jones, Redmond, WA (US); Jamie N. Wakeam, Redmond, WA (US); Rich Grutzmacher, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 173 days.

(21) Appl. No.: 10/222,509

(22) Filed: Aug. 15, 2002

(65) Prior Publication Data

US 2004/0032415 A1    Feb. 19, 2004

(51) Int. Cl.
G06F 3/01    (2006.01)
G06F 15/00   (2006.01)
G09G 5/00    (2006.01)

(52) U.S. Cl. .................. 345/619; 345/179; 345/676
(58) Field of Classification Search ........... 345/619, 345/676, 678–680, 179, 864; 715/864, 863
See application file for complete search history.

(56) References Cited

U.S. PATENT DOCUMENTS

| | | | |
|---|---|---|---|
| 4,686,649 A | 8/1987 | Rush et al. | |
| 4,709,348 A | 11/1987 | Horn et al. | |
| 5,220,649 A * | 6/1993 | Forcier | 715/863 |
| 5,231,698 A | 7/1993 | Forcier | |
| 5,428,805 A | 6/1995 | Morgan | |
| 5,502,803 A | 3/1996 | Yoshida et al. | |
| 5,517,578 A | 5/1996 | Altman et al. | |
| 5,553,217 A | 9/1996 | Hart et al. | |
| 5,590,257 A * | 12/1996 | Forcier | 715/530 |
| 5,613,019 A * | 3/1997 | Altman et al. | 382/311 |
| 5,623,679 A | 4/1997 | Rivette et al. | |
| 5,666,139 A | 9/1997 | Thielens et al. | |
| 5,778,404 A | 7/1998 | Capps et al. | |
| 5,838,321 A | 11/1998 | Wolf | |
| 5,953,735 A | 9/1999 | Forcier | |
| 5,956,423 A | 9/1999 | Frink et al. | |
| 6,105,044 A | 8/2000 | DeRose et al. | |

(Continued)

OTHER PUBLICATIONS

B. Wunsche and R. Lobb, A Scientific Visualization Schema Incorporating Perceptual Concepts, 2001, pp. 1-6.*

(Continued)

*Primary Examiner*—Jeffery A. Brier
(74) *Attorney, Agent, or Firm*—Banner & Witcoff, Ltd.

(57) ABSTRACT

A space tool that inserts space into or deletes space from a document is described. The space tool provides the user with feedback as to which objects will be moved when space is inserted into or deleted from a document. To provide the user with this feedback, the space tool identifies the objects that will be moved when space is inserted or deleted, and changes the appearance of these objects. For example, the space tool may gray out or fade identified electronic ink objects that will be moved. Alternatively, or additionally, the space tool may move identified objects in real time, so that their location continually corresponds with what their location will be after space has been inserted or deleted.

25 Claims, 15 Drawing Sheets

U.S. PATENT DOCUMENTS

| | | | |
|---|---|---|---|
| 6,128,633 | A | 10/2000 | Michelman et al. |
| 6,163,784 | A | 12/2000 | Taguchi |
| 6,326,970 | B1 | 12/2001 | Mott et al. |
| 6,340,967 | B1 | 1/2002 | Maxted |
| 6,408,092 | B1 | 6/2002 | Sites |
| 6,437,807 | B1 | 8/2002 | Berquist et al. |
| 6,473,102 | B1 | 10/2002 | Rodden et al. |
| 6,525,749 | B1 | 2/2003 | Moran et al. |
| 6,683,631 | B2 | 1/2004 | Carroll |
| 6,694,485 | B1 | 2/2004 | Kelley et al. |
| 6,752,317 | B2 | 6/2004 | Dymetman et al. |
| 6,820,237 | B1 | 11/2004 | Abu-Hakima et al. |
| 6,829,372 | B2 | 12/2004 | Fujioka |
| 2002/0059350 | A1* | 5/2002 | Iwema et al. ............... 707/530 |
| 2002/0069296 | A1 | 6/2002 | Aua et al. |
| 2002/0097270 | A1* | 7/2002 | Keely et al. ................ 345/764 |
| 2002/0152240 | A1* | 10/2002 | Kitainik et al. ............ 707/517 |
| 2003/0001899 | A1 | 1/2003 | Partanen et al. |
| 2003/0023631 | A1 | 1/2003 | Castle |
| 2003/0212958 | A1 | 11/2003 | Altman et al. |
| 2003/0226113 | A1 | 12/2003 | Altman et al. |
| 2005/0005246 | A1 | 1/2005 | Card |

OTHER PUBLICATIONS

H. Weinreich, H. Obendorf, W. Lamersdorf, The Look of the Link-Concepts for the User Interface of Extended Hyperlinks, 2001, pp. 1-10.*

Aha! InkWriter The simplicity of pen and paper, the power of word processing., Advertisement, 1983, 2 pp., aha! software corporation, Mountain View, CA.

Aha! InkWriter for Magic Cap "The fastest, most convenient way to create faxes, notes and messages." Advertisement, 1993, 1994, 2 pp., aha! software corporation, Mountain View, CA.

Aha! 2.0 for Windows InkWriter The power of word processing, the convenience of pen and paper, Advertisement, 1994, 1995, 2 pp., aha! software corporation, Mountain View, CA.

Aha! software products, Web Page List of Products, Sep. 24, 1997, pp. 1-5, aha! software corporation, Mountain View, CA.

Gitchell, David, et al., "Sim: A Utility for Detecting Similarity in Computer Programs", ACM SIGCSE Bulletin, vol. 31, Issue 1, Mar. 1999, pp. 266-270.

Anderson, Corin R., et al., "Personalizing Web Sites for Mobile Users", Proceedings of the Tenth International Conference on World Wide Web, Apr. 2001, pp. 565-575.

Das, Sumi, TechTV Vault, downloaded from http://www.g4tv.com/techtvvaulUfeatures/15435/DPWeb_DX_Palm_Browser.html, Apr. 7, 2000, pp. 1-3.

Furuta, Richard, et al., "Document Formatting Systems: Survey, Concepts, and Issues", ACM Computing Surveys (CSUR), vol. 14, Issue 3, Sep. 1982, pp. 417-472.

Chen, Pehong, et al., "Incremental Document Formatting", Proceedings of the First ACM International Conference on Multimedia, Sep. 1993, pp. 93-100.

Gourley, John S., "A Language for Music Printing," Communications of the ACM, vol. 29, Issue 5, May 1986, pp. 388-401.

Bjork et al., "WEST: A Web Browser for Small Terminals," Proc. of the 12th Annual ACM Symposium on User Interface Software and Technology, Nov. 1999, pp. 187-196.

Moran et al., Pen-based Interaction Techniques for Organizing Material on an Electronic Whiteboard, UIST 97, copyright 1997, ACM, pp. 45-54.

Wilcox et al., Dynomite A Dynamically Organized Ink and Audio Notebook, CHI 97 Eelectronic Publication, copyright ACM 1997, pp. 1-15.

Fulton, Jennifer, "10 Minute Guide to Excel 97", Que Publishing, Dec. 1996.

Blostein, D. et al. "Justification of Printed Music", Communications of the ACM, Vol. 34, No. 3, Mar. 1991, pp. 88-99.

* cited by examiner

Figure 6A

SPACE TOOL FEEDBACK BY CHANGING THE DISPLAYED VISUAL APPEARANCE OF OBJECTS TO BE MOVED BEFORE DELETION OF DISPLAYED OBJECTS OCCURS

FIELD OF THE INVENTION

The present invention relates to a tool for inserting space into or deleting space from a document. More particularly, the present invention relates to a space tool that provides feedback to a user that clearly indicates which objects in the document will be moved when the tool inserts space into or deletes space from a document.

BACKGROUND OF THE INVENTION

As hand-held computers are becoming ubiquitous, more and more people are saving a wide variety of information in electronic documents. Advantageously, many computers no longer require a user to employ a keyboard to save information in an electronic document. Instead, these computers now allow a user to handwrite or draw information (sometimes also referred to as content) directly onto the electronic "paper" of an electronic document with a pen or stylus. The electronic paper offered by these computers is thus quickly becoming a substitute for handwriting information onto conventional paper, even for users that cannot type.

One significant advantage that electronic documents have over conventional paper documents is that space can be inserted anywhere in the document, even if the desired location already contains content. The user can simply indicate the position where he or she wishes the additional space to be inserted, and the computer will move the objects in the document below that position by a sufficient amount to insert the desired space. For example, if the user is taking notes, and wishes to insert an additional comment between two existing notes, the user can simply insert the space required to write the additional comment. Similarly, a user can easily delete empty space from a document, to reduce its size. The computer will then move the objects below the deleted space upward to fill the gap left by the deleted space.

In some situations, however, it may be difficult for a user to accurately gauge which objects will be moved when space is inserted into or deleted from a document. When the document is made up of lines of typewritten text, the user can select a position between typewritten lines where space is to be inserted or deleted. This allows a user to precisely control which typewritten lines of text will be moved when the space is inserted or deleted. If the document contains handwritten electronic ink or drawings, on the other hand, then it may be difficult for the user to know with certainty which objects will be moved when space is inserted or deleted.

For example, FIG. 7 illustrates a portion of a document containing handwritten characters in electronic ink 701. In particular, this document portion includes one handwritten line containing the word "for" 703 and a second handwritten line containing the word "that" 705. If the user wishes to insert space at position 707, this position horizontally corresponds to the overlap between the letter "f" in the word "for" 703 and the letter "t" in the word "that" 705. Thus, the user may be uncertain as to whether the word "for" 703 will be shifted downward if space is inserted at position 707. Of course, while the example provided in FIG. 7 is relatively simple, a document containing a number of different drawings, handwritten lines at different angles, or more overlap between handwritten lines would pose an even more difficult problem in determining which objects will be moved if space is inserted or deleted.

Accordingly, there is a need for a space tool that provides feedback to clearly identify for the user which objects will be moved if space is inserted or deleted. More particularly, there is a need for a space tool that provides feedback that accurately informs the user as to which objects will be moved if space is inserted at or deleted from a position designated by the user, while the user still has an opportunity to change that position.

SUMMARY OF THE INVENTION

Advantageously, various aspects of the invention relate to a space tool that provides a user with clearly recognizable feedback indicating which objects will be moved if space is inserted at or deleted from a selected position. When a user designates a threshold position to define the amount of space to be inserted into or deleted from a document, the space tool identifies the objects that will move when that defined space is inserted into or deleted from the document. It then changes the appearance of those identified objects. For example, the space tool may fade, bold or color identified electronic ink objects or images. Further, the space tool may provide a faded, bold, colored or dashed bounding box around identified text boxes or images. Still further, the space tool may simply change the location of identified objects in real time, to correspond with what their location will be after the defined space has been inserted or deleted. Moreover, the space tool can display a cursor line corresponding to the threshold position that extends across the segment of the document into which space will be inserted. This cursor line will then provide the user with a visual demarcation of the objects below the threshold position that will be shifted when space is inserted or deleted.

BRIEF DESCRIPTION OF THE DRAWINGS

Figure 6A:
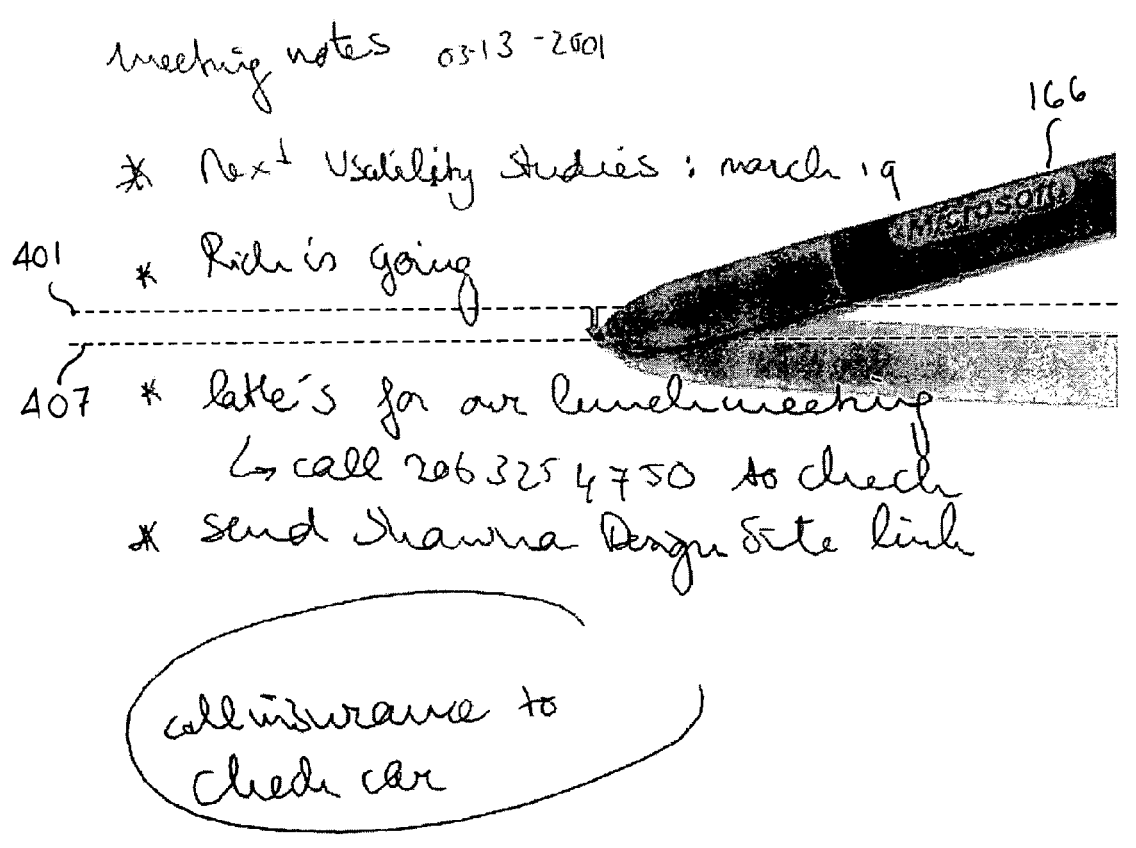

FIGS. 6A and 6B illustrate the feedback provided to a user when space is inserted into a document according to another embodiment of the invention.

DETAILED DESCRIPTION OF PREFERRED EMBODIMENTS

Overview

The present invention relates to a space tool that inserts space into or deletes space from a document. More particularly, the present invention relates to a space tool that provides the user with feedback as to which objects will be moved when space is inserted into or deleted from a document. To provide the user with this feedback, the space tool identifies the objects that will be moved when space is inserted or deleted, and changes the appearance of these objects. For example, the space tool may fade, bold, or color identified electronic ink objects that will be moved. Alternatively, or additionally, the space tool may move identified objects in real time, so that their location continually corresponds with what their location will be after space has been inserted or deleted.

Exemplary Operating Environment

As previously noted, a space tool according to the invention may be implemented using software. That is, the space tool may be described in the general context of computer-executable instructions, such as program modules, executed by one or more computing devices. Generally, program modules include routines, programs, objects, components, data structures, etc. that perform particular tasks or implement particular abstract data types. Typically the functionality of the program modules may be combined or distributed as desired in various embodiments.

Figure 1:
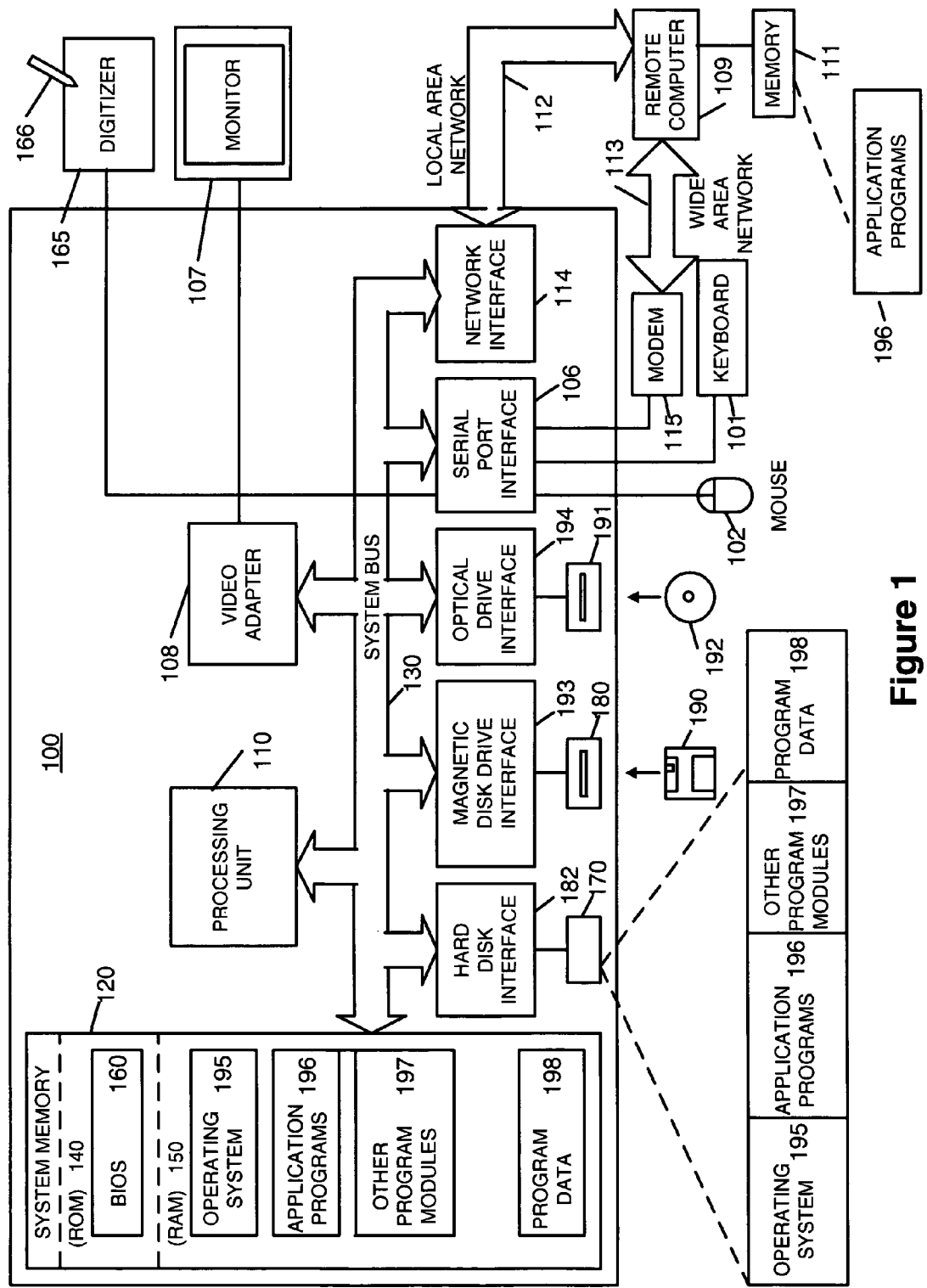
FIG. 1 shows a schematic diagram of a general-purpose digital computing environment that can be used to implement various aspects of the invention.

Because the invention may be implemented using software, it may be helpful for a better understanding of the invention to briefly discuss the components and operation of a typical programmable computer on which various embodiments of the invention may be employed. Such an exemplary computer system is illustrated in FIG. 1. The system includes a general-purpose computer 100. This computer 100 may take the form of a conventional personal digital assistant, a tablet, desktop or laptop personal computer, network server or the like.

Computer 100 typically includes at least some form of computer readable media. Computer readable media can be any available media that can be accessed by the computer 100. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The computer 100 typically includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150. A basic input/output system 160 (BIOS), containing the basic routines that help to transfer information between elements within the computer 100, such as during start-up, is stored in the ROM 140.

The computer 100 may further include additional computer storage media devices, such as a hard disk drive 170 for reading from and writing to a hard disk, a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 182, a magnetic disk drive interface 193, and an optical disk drive interface 194, respectively. The drives and their associated computer-readable media provide nonvolatile storage of computer readable instructions, data structures, program modules, and other data for the personal computer 100.

It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment. Also, it should be appreciated that more portable embodiments of the computer 100, such as a tablet personal computer or personal digital assistant, may omit one or more of the computer storage media devices discussed above.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through various input devices, such as a keyboard 101 and a pointing device 102 (for example, a mouse, touchpad, or pointing stick). The computer 100 may also have additional input devices, such as a joystick, game pad, satellite dish, scanner, touch screen, or the like.

As previously noted, the invention is directed to a space tool for inserting and deleting space from a document. As will be appreciated by those of ordinary skill in the art, while space to be inserted or deleted can be designated using a variety of pointing devices, such as a mouse, a trackball, a touchpad, or a joystick. One particularly convenient pointing device for this task is a pen, however, as the user may wish to insert space in order to add handwritten notes into the document. Accordingly, the computing device 120 may include a digitizer 165 and a stylus or pen 166, which a user can then employ to designate space to be inserted into or deleted from a document. The digitizer 165 receives position input when the stylus or pen 166 contacts the surface of the digitizer 165, and may also receive position input when the stylus or pen 166 hovers over the surface of the digitizer 165.

These and other input devices often are connected to the processing unit 110 through a serial port interface 106 that is coupled to the system bus 130, but may be connected by other interfaces, such as a parallel port, game port, IEEE-1394B bus, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers. As will be appreciated by those of ordinary skill in the art, the monitor 107 may incorporate the digitizer 165. This arrangement conveniently allows a user to employ the pen 166 to point directly to positions displayed on the monitor 107 by contacting the display screen of the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, and thus will not be explained in detail here.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, may be connected to the system bus 130 via the serial port interface 106. In a networked environment, program modules depicted relative to the personal computer 100, or portions thereof, may be stored in a remote memory storage device. Of course, it will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

The Space Tool

Figure 2:
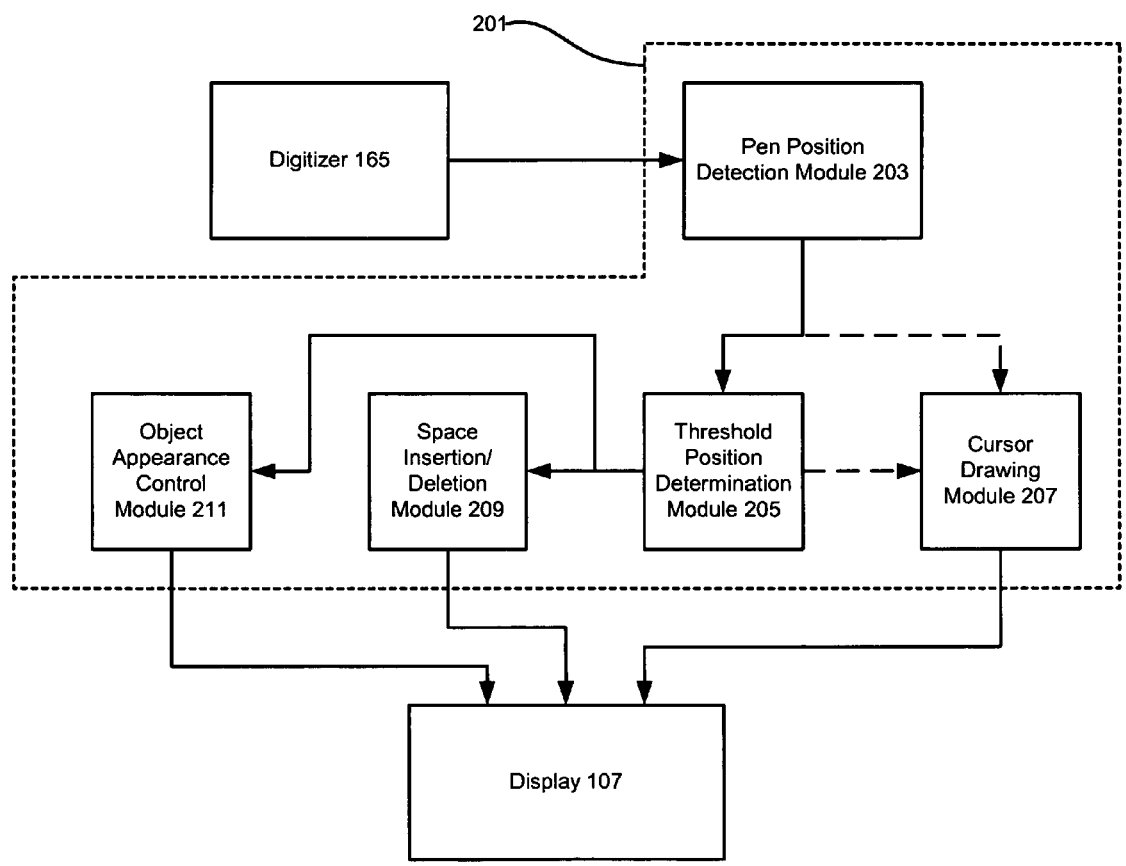
FIG. 2 illustrates a space tool that provides feedback according to one embodiment of the invention when employed to insert or delete space.
Figure 3A:
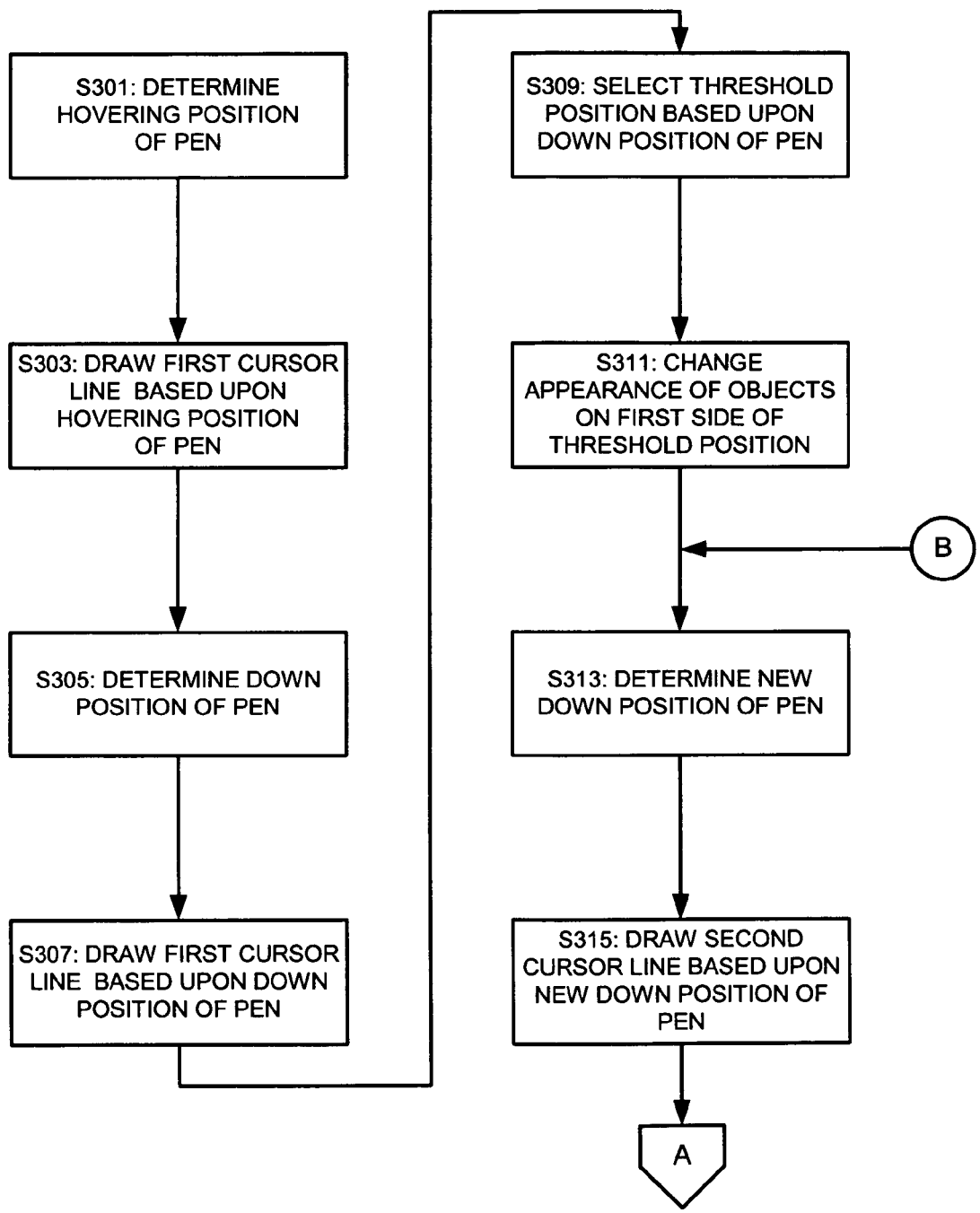
FIGS. 3A and 3B illustrate a flowchart describing a process for inserting or deleting space while providing feedback to a user according to one embodiment of the invention.
Figure 3B:
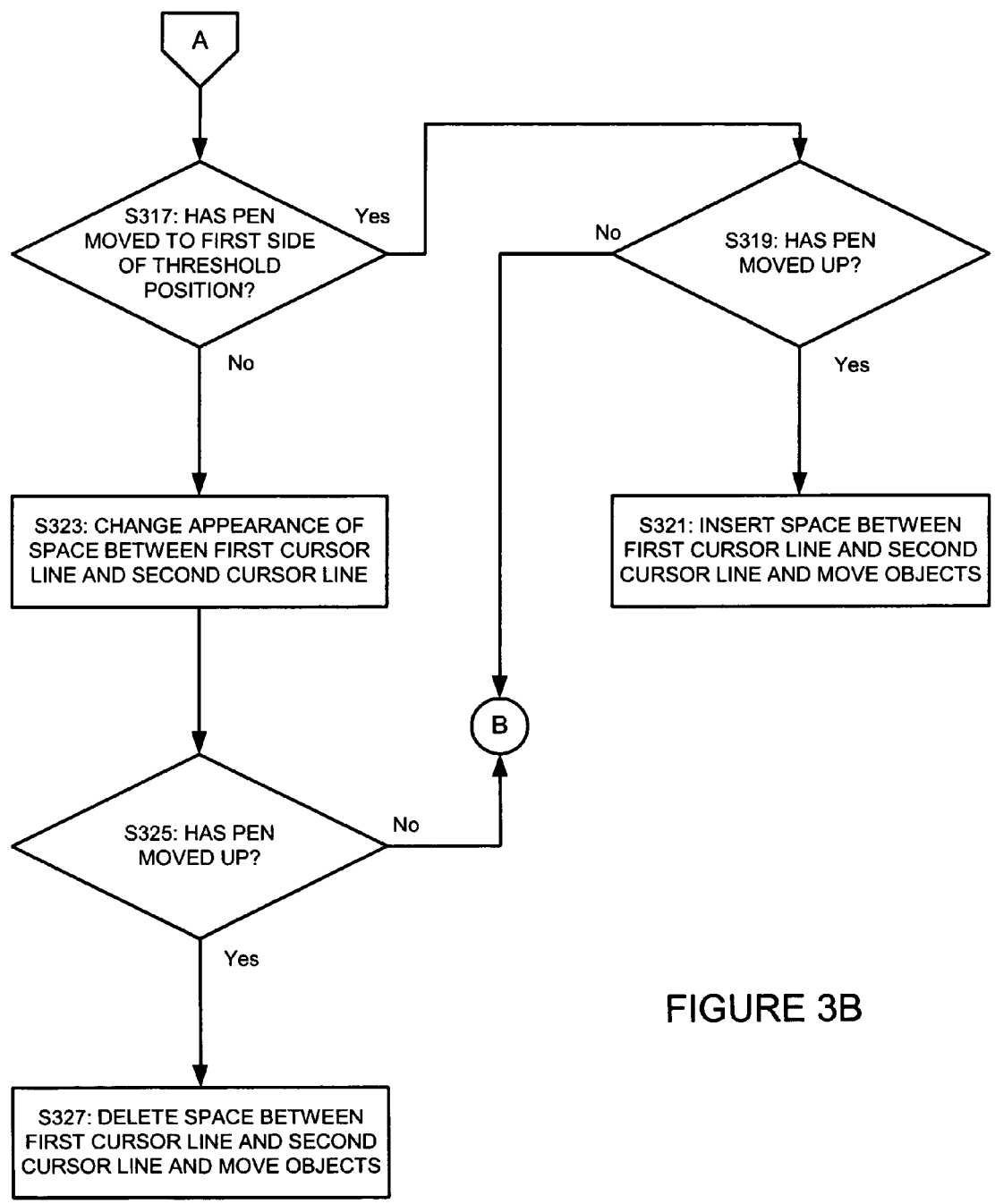

FIG. 2 illustrates an exemplary space tool 201 according to the invention. As seen in this figure, the space tool 201 includes a pointer position detection module 203, which detects the position of a pen 166 or other pointing device. More particularly, the pointer position detection module 203 detects a physical location of a pen 166 or pointing device, and determines a corresponding pointer position in an electronic document. With some embodiments of the space tool 201, the pointer position detection module 203 can detect the position of the pen 166 both when the pen 166 contacts the surface of the digitizer 165 and when the pen 166 hovers above the surface of the digitizer 165.

The space tool 201 also includes a threshold position determination module 205. As will be discussed in detail below, the threshold position determination module 205 determines a first threshold position and a second threshold position corresponding to pointer positions identified by the pointer position detection module 203. These threshold positions define the location and boundaries of space that will be inserted into the document for a space insertion procedure, and the amount and location of space that will be deleted from the document by a space deletion procedure. As will also be discussed below, the threshold positions may correspond directly to pointer positions identified by the pointer position determination module 203 or they may be offset from the identified pointer positions.

The space tool 201 may optionally include a cursor drawing module 207. The cursor drawing module 207 receives the first threshold position from the threshold position determination module 205, and draws a cursor line corresponding to this position. If the first threshold position corresponds directly to a pointer position detected by the pointer position detection module 203, however, then the cursor drawing module 207 may alternatively obtain that position directly from the pointer position detection module 203, as indicated by the dotted line in FIG. 2. The cursor drawing module 207 may also draw a cursor line corresponding to the second threshold position. As will be explained later, these cursors provide the user with a clear demarcation as to where space will be inserted or deleted, and which objects fall above and below the insertion or deletion of the space.

The space insertion/deletion module 209 inserts space into a document between the first and second threshold positions identified by the threshold position determination module 205. Similarly, the space insertion/deletion module 209 deletes space from a document bounded by the first and second threshold positions identified by the threshold position determination module 205. Thus, with the illustrated embodiment, the first threshold position and the second threshold position define the space to be inserted or deleted.

Whether the space insertion/deletion detection module 209 inserts or deletes space depends upon the location of the second threshold position relative to the first threshold position. For example, with some embodiments of the invention, if the user locates the second threshold position below the first threshold position, then the space/insertion deletion module 209 will insert space between the first threshold position and the second threshold position. If, however, the user locates the second threshold position above the first threshold position, then the space insertion/ deletion module 209 will delete the space between the first threshold position and the second threshold position. With other embodiments of the invention, this arrangement may be reversed. That is, if the user locates the second threshold position above the first threshold position, then space will be inserted, while space will be deleted if the user locates the second threshold position below the first threshold position.

After the threshold position determination module 205 has determined a first threshold position from a pointer position determined by the pointer position detection module 203, the object appearance control module 211 identifies the objects that will be moved if space is inserted or deleted at that first threshold position. It then changes the appearance of those identified objects so that they can be easily noted by the user. With some embodiments of the invention, the object appearance control module 211 will identify and change the appearance of only those objects located 100% below the first threshold position. For alternate embodiments of the invention, however, the object appearance control module 211 may identify and change the appearance of only those objects located 90% or more below the first threshold position, 80% or more below the first threshold position, 60% or more below the first threshold position, 51% or more below the first threshold position, or any other desired percentage located below the first threshold position. Of course, still other criteria may be used to determine which objects will be moved when space is inserted into or deleted from a document.

As will be appreciated by those of ordinary skill in the art, the term "object" refers to any integral item contained in the document. For example, an individual image or text box may be considered an object if it is not intended to be divided into parts by an editing operation. With regard to electronic ink, an object may be any collection of electronic ink strokes defined as the smallest integral unit by a parser. Thus, a parser may group collections of ink strokes into letters, collections of letters into words, collections of words into lines, and collections of lines into paragraphs. The parser may designate, however, that the smallest integral item (that is, the type of item which would normally not be broken up by editing operations) is a word.

With this definition, the object appearance control module 211 may determine that the location of one electronic ink word in a paragraph will move if space is inserted or deleted, but that another electronic ink word in that paragraph will not move. The object appearance control module 211 would not, however, identify and change the appearance of one letter in an electronic ink word without identifying and changing the appearance of the other letters in the word. As will be discussed in detail below, a parser may be further used to determine whether the appearance of associated groups of objects are changed together if one of the objects in the group is located below the first threshold position.

The object appearance control module 211 may alter the appearance of objects using any desired technique. For example, with some embodiments of the invention, the object appearance control module 211 may change the color of, bold, underline, or hollow those ink objects that will be moved if space is inserted or deleted. In the illustrated embodiment, the object appearance control module 211 will fade electronic ink objects and some images using, for example, alpha blending. For objects that are not easily faded, such as a text boxes or some images, the object appearance control module 211 may provide a dashed, bolded, colored and/or faded bounding box for the object.

Still further, as previously noted, some embodiments of the invention may actually shift the location of objects that will move if space is inserted or deleted, so as to maintain their relative distance from the second threshold position that defines the space that will be inserted or deleted. Thus, as the user moves the location of the second threshold position up and down before fixing the second threshold position at a desired location, the identified objects will similarly be moved up and down by the same amount as the second threshold position. In other words, the object appearance control module 211 may move the identified objects in real time so that they are always positioned at the locations they would be moved to if the currently defined space was inserted or deleted.

Operation of the Space Tool

The operation of the space tool 201 illustrated in FIG. 2 will now be discussed with reference to FIGS. 3A, 3B, 4A–4D, 5A–5D, 6A and 6B. In this example, the user employs a pen 166 to initiate and control the operation of the space tool 201. It should be appreciated, however, that a user may employ other types of pointing or control devices to initiate and control the operation of the space tool 201, such as a mouse, trackball, touchpad, or joystick. Any conventional technique can be used to initiate the operation of the space tool 201. For example, the user may direct the pointer to an icon provided on the display 107 representing the space tool 201, and then activate a command button or contact the icon (that is, the user may initiate the space tool 201 by "clicking" on an icon for the space tool 201). Alternatively, if the user is employing the pen 166, then the user may perform a designated gesture with the pen 166 to activate the space tool 201. Of course, still other techniques known to those of ordinary skill in the art may be employed to activate the space tool 201.

Figure 4A:
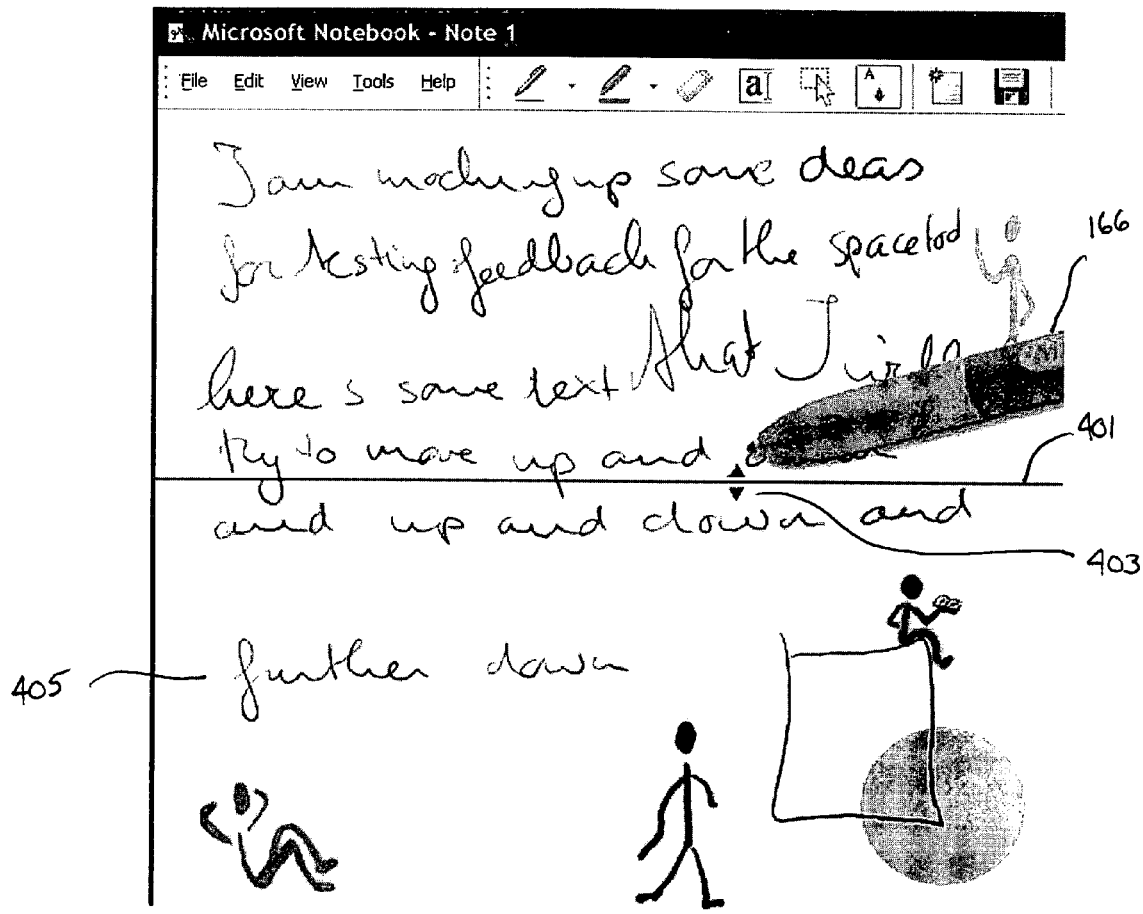
FIGS. 4A–4D illustrate the feedback provided to a user when space is inserted into a document according to an embodiment of the invention.

Once the space tool 201 has begun operating, in step 301 the pointer position detection module 203 detects the hovering position of the pen 166, and determines a corresponding pointer position in the document. In response, the cursor drawing module 207 draws a cursor line 401 through the pointer position in step 303, as shown in FIG. 4A. The cursor drawing module 207 may also draw an indicator, such as arrows 403, to confirm to the user that the space tool 201 has been initiated. In the illustrated embodiment of the invention, the cursor drawing module 207 draws the cursor line 401 based solely upon the pointer position determined by the pen position detection module 203. With some embodiments of the invention, however, the threshold position determination module 205 may determine a first threshold position from the pointer position before the cursor is drawn. In these embodiments, the cursor drawing module 207 may alternatively draw the cursor line 401 based upon the first threshold position rather than the pointer position alone.

It should be noted that, while the pen 166 is hovering above the digitizer 165, the space tool 201 will not start the insertion/deletion process. Accordingly, as may be seen in FIG. 4A, the appearance of the word "further" 405 is unchanged while the pen 166 is hovering. The space tool 201 begins the insertion/deletion process only after the user has contacted the pen 166 against the digitizer 165. With these embodiments, the space tool 201 provides the cursor line 401 to help the user more accurately contact the pen 166 against the digitizer 165. Also, by drawing the cursor line 401, the cursor drawing module 207 provides the user with a general reference indicating which objects in the document will remain fixed if space is inserted or deleted at the current pointer position, and which objects will be moved if space is inserted or deleted at the current pointer position. It should be noted, however, that other embodiments of the invention may determine the first threshold position, identify the objects that will be moved if space is inserted at or deleted from that threshold position, and change the appearance of those identified objects based upon the hovering location of the pen 166.

Figure 4B:
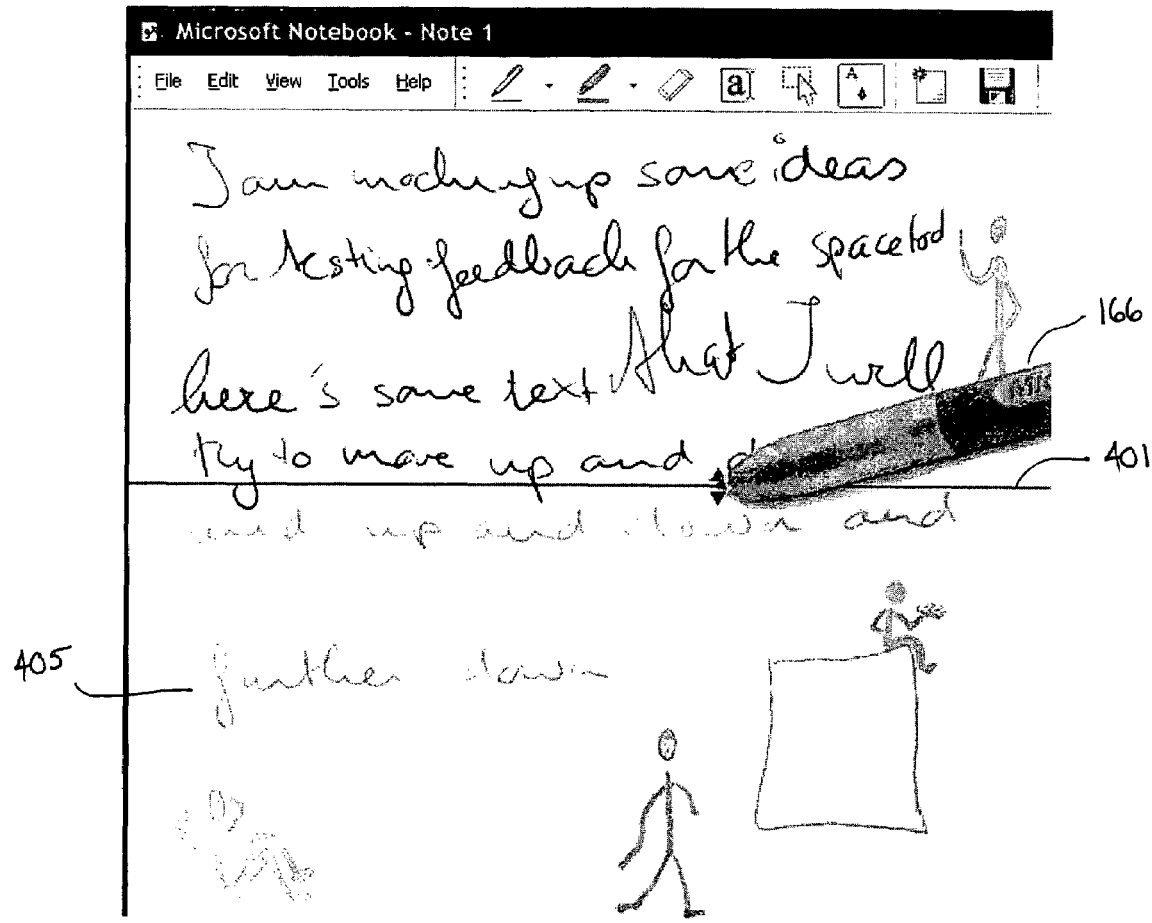

Next, to begin the insertion/deletion process with the illustrated space tool 201, the user contacts the pen 166 against the digitizer 165, as shown in FIG. 4B. The pointer position detection module 203 detects the "down" position of the pen 166 against the digitizer 165 in step 305, and determines a corresponding pointer position in the document. In response, the cursor drawing module 207 draws the cursor line 401 through the pointer position in step 307. Then, in step 309, the threshold position determination module 205 determines a first threshold position corresponding to the pointer position.

The threshold position determination module 205 may determine the first threshold position in different ways, depending upon the settings of the space tool 201. For example, with some applications, the user will be employing the space tool 201 to insert space into or delete space from a document that contains stationary lines or guidelines. Stationary lines are useful for handwritten documents, as they provide guides that assist a user to write in a level direction and with regular spaces between each line. Accordingly, if the user wishes to insert or delete space from a document containing stationary lines, the user may desire to have the inserted or deleted space correspond with the stationary lines. In these instances, the user may set the space tool 201 to operate in a "snap-to" mode, so that the space tool 201 inserts and deletes space after taking the stationary lines into account. The "snap-to" mode may be selected in any conventional manner, such as, for example, by activating a command on a tool bar for the space tool 201.

If the space tool 201 is operating in the "snap-to" mode, then the threshold position determination module 205 determines the first threshold position by first calculating the height between the stationary lines. It then designates the first threshold position to be at a location above the pointer position by a distance of half the stationary line height. Thus, the threshold position determination module 205 will use half of the height of the stationary line as a rounding value to include objects that may extend just above the pointer position. By providing this rounding value, the threshold position determination module 205 gives the user some flexibility in locating the pointing device. Otherwise, the user might need to employ an inconvenient amount of precision to correctly locate the pointing device at the desired position. It should be noted, however, that any desired value, such as one-fourth, one-third or three-fourths of the stationary line height, may alternatively be used as the rounding value. Further, the rounding value may be a fixed value, such as 5 millimeters, or be based upon a line height determined by the parser, rather than upon the stationary line height. Still further, with some embodiments of the invention, use of the rounding value can be omitted altogether.

In the illustrated embodiment, if the space tool 201 is not operating in the "snap-to" mode, then the threshold position determination module 205 simply determines the first threshold position to be the same as the pointer position. For alternate embodiments of the invention, however, the threshold position may be determined using a rounding value even if the space tool 201 is not operating in the "snap-to" mode. As noted above, the rounding value may be any desired value, including a fixed value, a value based upon a stationary line height or a value based upon a line height determined by the parser.

As previously noted, the cursor drawing module 207 draws the cursor line 401 through the pointer position rather than the first threshold position. With some embodiments of the invention, however, when the space tool 201 is operating in the "snap-to" mode, the cursor drawing module 207 may instead wait until the threshold position determination module 205 determines the first threshold position, and draw the cursor line 401 through the first threshold position rather than through the pointer position.

Next, in step 311, the object appearance control module 211 identifies those objects that will be moved if space is inserted or deleted, and changes the appearance of those objects. More particularly, the object appearance control module 211 identifies those objects that are 100% below the first threshold position. It then fades (using for example, alpha blending) the identified electronic ink objects. Thus, as shown in FIG. 4B, when the pen 166 contacts the digitizer 165, the word "further" 405 located below the first threshold position is faded. The object appearance control module 211 may also fade images that are 100% below the first threshold position. As will be appreciated by those of ordinary skill in the art, however, some objects, such as text boxes and some images, do not lend themselves to fading. Accordingly, the object appearance control module 211 will draw a dotted or dashed bounding box around these objects.

It should be appreciated that the object appearance control module 211 may use any other suitable techniques to distinguish the objects that will be moved with the insertion or deletion of space from those objects that will remain fixed. For example, rather than using fading, the object appearance control module 211 may bold, underline, hollow, and/or change the color of objects that will move when space is inserted or deleted. Also, alternate embodiments of the invention, may additionally or alternatively fade, bold, hollow, or change the color of the bounding boxes of objects that will be moved with the insertion or deletion of space.

In addition, as previously discussed, the object appearance control module 211 may actually move the identified objects in real time to correspond with what their locations will be after the currently defined space is inserted or deleted. This is graphically shown in FIGS. 6A and 6B. As seen in these figures, the electronic ink handwriting and drawings below the second cursor line 407 move down with the cursor line 407 (corresponding to the second threshold position defining the space to be inserted or deleted), so as to maintain a constant distance from the cursor line 407. Thus, the electronic ink handwriting and drawings are maintained at the location they would have if the currently defined space were inserted between the first cursor line 401 and the second cursor line 407.

Also, it should be noted that various embodiments of the space tool 201 may employ different criteria for determining whether an object will move when space is inserted or deleted. For example, some embodiments of the invention may designate that an object will move only if 90% or more of the object is below the first threshold position. Still other embodiments of the invention may designate that an object will move if 80% or more of the object is below the first threshold position, while other embodiments of the invention may designate that an object will move if 60% or more of the object is below the first threshold position. Alternatively, some embodiments of the invention may designate that an object will move if 51% or more of the object is below the first threshold position. Of course, still other embodiments may employ any desired percentage or other type of criteria to determine whether an object will move when space is inserted or deleted. For example, with some embodiments, when the space tool 201 is operating in the "snap-to" mode, the object appearance control module 211 may determine that an object will move if it extends less than a portion of the stationary line height (for example, less than one half of the stationary line height) above the first threshold position.

As also previously noted, a parser may be employed to determine whether an object will move when space is inserted or deleted. With the illustrated example, the space tool 201 is configured to allow one word in a line to move when space is inserted or deleted, while simultaneously allowing another word in the line to remain fixed. With alternate embodiments of the invention, however, the space tool 201 may be configured to discourage space from being inserted into or deleted from between words in a single line. With these embodiments, the parser can be used to identify the associations between objects, such as the association of words forming a line or lines forming a paragraph.

For example, when the object appearance control module 211 identifies a first object as one that that would move if space is inserted or deleted, it could then similarly designate other objects associated with the first object that intersect a horizontal line through the first threshold position as objects that would also move if space was inserted or deleted. Thus, the object appearance control module 211 would change the appearance of all of the objects associated with the first object, and the space insertion/deletion module 209 would insert space into or delete space from the document so as to move those associated objects with the first object. Some embodiments might consider the parser results, however, only if the lines identified by the parser were within a designated angle (for example, within 10° of horizontal) to the cursor line 401, to prevent the parser from inadvertently associating and moving objects that would be counterintuitive or unnatural to the user.

With the illustrated space tool 201, the insertion of space causes the objects below the inserted space to move downward. Similarly, the deletion of space causes the objects below the deleted space to move upward. With alternate embodiments of the invention, however, the insertion of space could cause the objects above the inserted space to move upward, while the deletion of space could cause the objects above the deleted space to move downward. With these embodiments, the object appearance control module 211 will not identify objects below the first threshold position as objects that will move upon the insertion or deletion of space. Instead, the object appearance control module 211 will identify objects above the first threshold position as objects that move upon the insertion or deletion of space into the document.

Figure 4C:
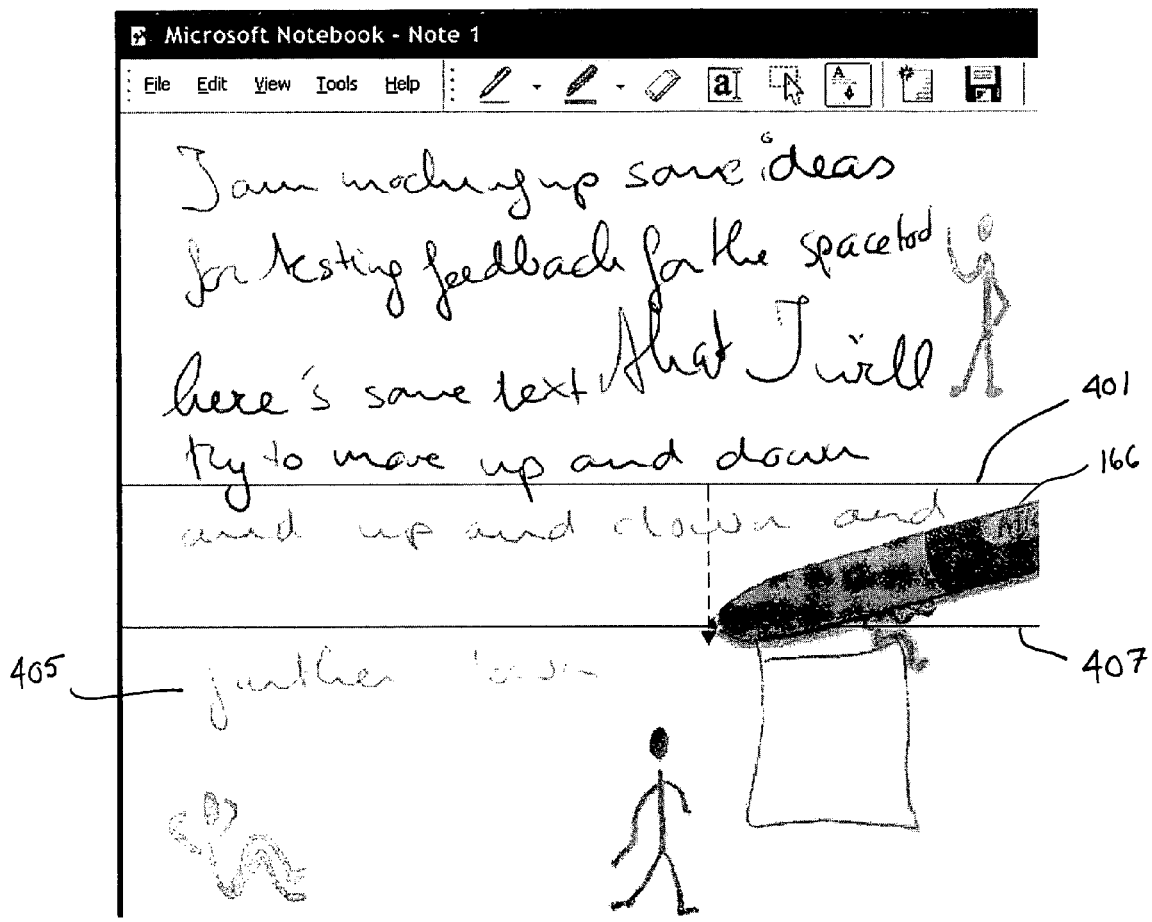

Next, as shown in FIG. 4C, the user drags the pen 166 along the surface of the digitizer 165 to determine the amount of space that is inserted or deleted. As shown in FIG. 4C, the user is the dragging the pen 166 downward, indicating that the space tool 201 should insert space, rather than delete space. In step 313, the pointer position detection module 203 detects the new position of the pen 166, and determines a new pointer position corresponding to the new pen position. Then, in step 315, the cursor drawing module 207 draws a second cursor line 407 corresponding to the new pointer position.

In step 317, the threshold position determination module 205 determines a second threshold position corresponding to the new pointer position, and determines whether the pen 166 has moved to a location below the first threshold position or above the first threshold position. In the illustrated embodiment, the second threshold position corresponds directly to the new pointer position. With alternate embodiments of the invention, however, the threshold position determination module 205 may determine the second threshold position using a rounding value as described above with regard to the first threshold position. The rounding value for determining the second threshold position may be the same as the rounding value for the first threshold position, or it may be different. Also, the rounding value for the second threshold position can be selected using any of the criteria described above with regard to the selection of the rounding value for the first threshold position. Further, the rounding value may be employed in both when the tool 201 is in the "snap-to" mode and when the tool 201 is not in the "snap-to" mode.

Further, while the illustrated embodiment draws the second cursor line 407 through the new pointer position, with alternate embodiments of the invention, the cursor drawing module 207 may wait to draw the second cursor 407 until the threshold position determination module 205 determines the location of the second threshold position. The cursor drawing module 207 may then draw the second cursor 407 through the second threshold position rather than the second pointer position.

Turning now to FIG. 4C, as shown in this figure the pen 166 has moved below the first threshold position, indicating that space is to be inserted into the document. Next, in step 319, the pointer position detection module 203 determines if the user has lifted the pen 166 up from the digitizer 165, thereby ending the space insertion procedure. If the user has not lifted pen 166 up from the digitizer 165, then the space tool 201 concludes that the user is still determining the amount of space to be inserted into or deleted from the document, and loops back to step 313.

Figure 4D:
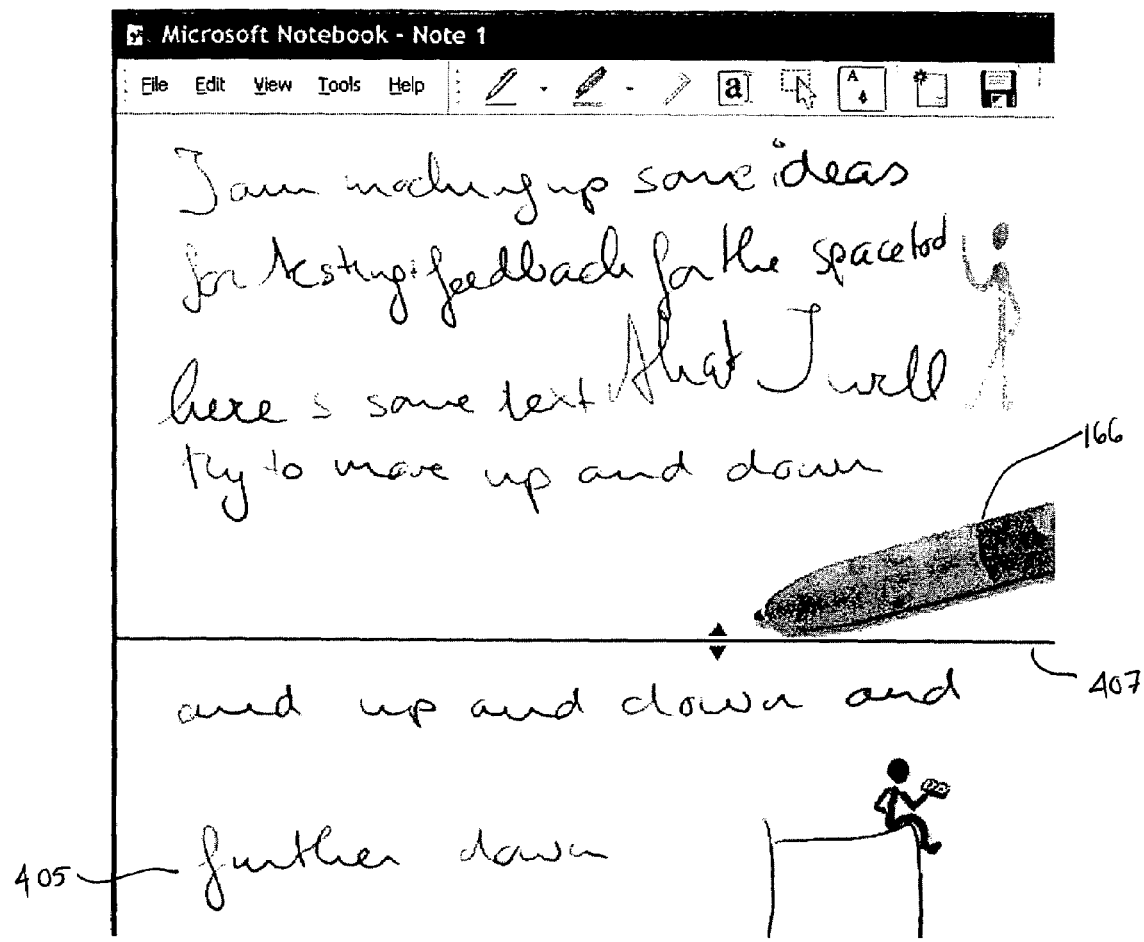

If, however, the user has lifted the pen 166 up from the digitizer 165 as shown in FIG. 4D, then the space tool 201 concludes that the user has completed the insertion procedure. Thus, in step 321, the space insertion/deletion module 209 inserts space into the document between the first threshold position and the second threshold position. It also moves the objects identified by the object appearance control module 211 to their new location. When the space tool 201 is operating in the "snap-to" mode, then the space insertion/deletion module 209 may insert (or delete) space so as to maintain the relationship between the moved objects and stationary lines. For example, if an electronic ink word is initially aligned on a stationary line, then it will remain aligned on a stationary line after space is inserted or deleted. Thus, the space insertion/deletion module 209 may insert space that falls short of the distance defined between the first and second threshold positions, in order to ensure that the inserted space corresponds with the stationary lines. Similarly, the space insertion/deletion module 209 may insert space that exceeds the distance between the first and second threshold positions, to ensure that the boundary of the inserted space matches a stationary line.

With some embodiments of the invention, the space tool 201 will automatically deactivate once space has been successfully inserted or deleted into the document. With alternate embodiments of the invention, however, the space tool 201 will remain active until the user specifically deactivates the tool 201. Still further, the space tool 201 may automatically deactivate when the pen 166 is lifted from the digitizer 165, regardless of whether space has been successfully inserted into or deleted from the document.

Figure 5A:
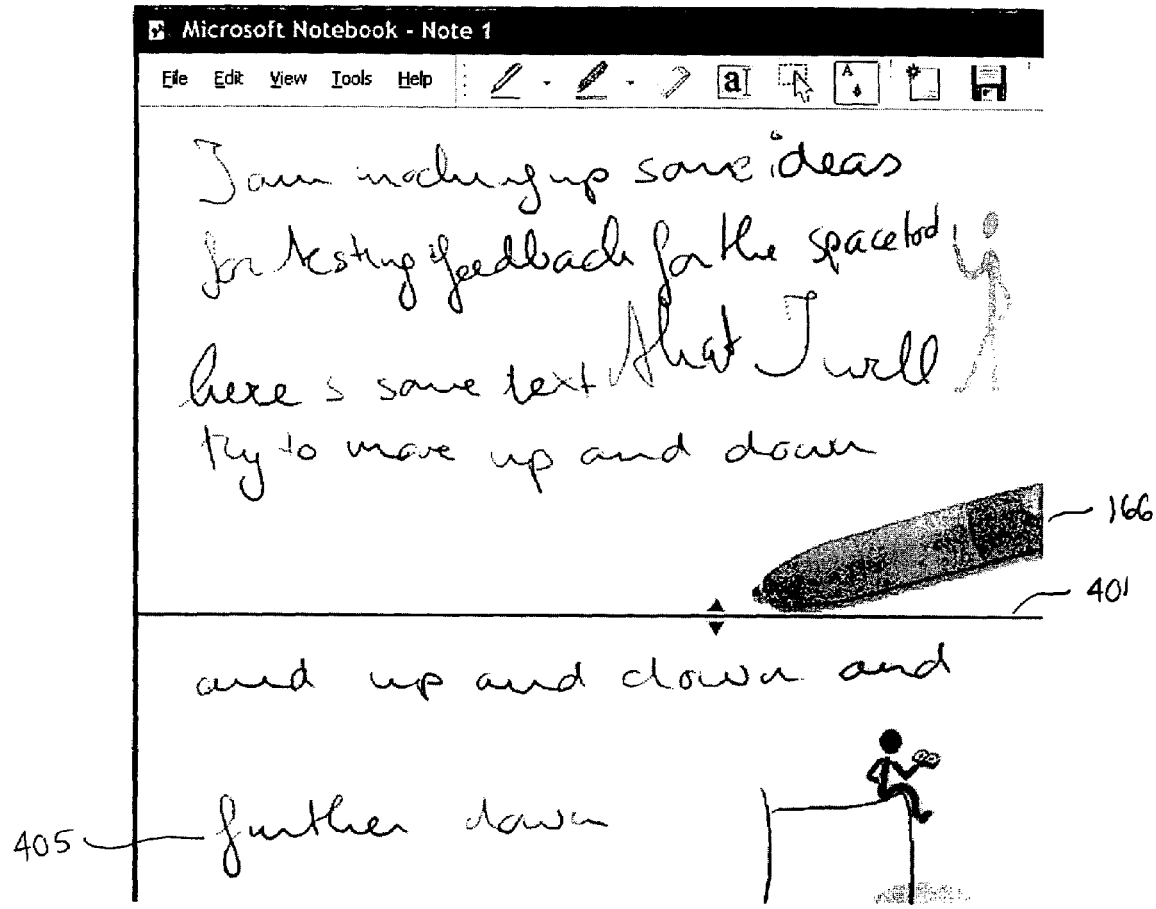
FIGS. 5A–5D illustrate the feedback provided to a user when space is deleted from a document according to an embodiment of the invention.
Figure 5B:
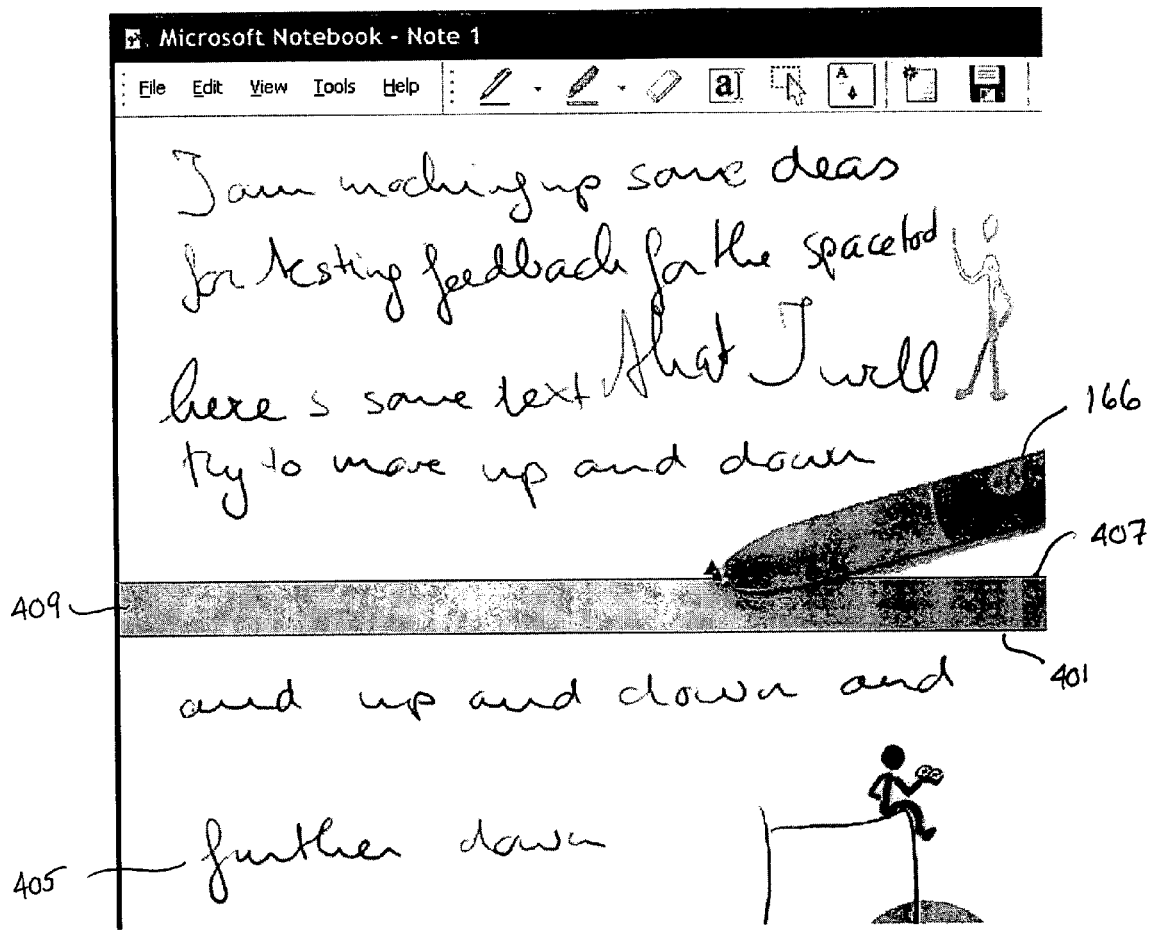

While FIGS. 4A–4D illustrate the insertion of space into a document, FIGS. 5A–5D illustrate the deletion of space from a document. To delete space, the space tool 201 follows steps 301–315 as described above. Thus, as shown in FIG. 5A, when the pen 166 hovers above the digitizer 165, the cursor drawing module 207 draws the first cursor line 401. Similarly, as shown in FIG. 5B, after the pen 166 has contacted the digitizer 165 and been moved along the surface of the digitizer 165, the cursor drawing module 207 draws a second cursor line 407 corresponding to the new pointer position. For the deletion of space, however, the pen 166 is moved above the first threshold position determined when the pen 166 initially contacted the digitizer 165. Thus, in step 317, when the threshold position determination module 205 determines a second threshold position corresponding to the new pointer position, it also determines that the second threshold position is above the first threshold position.

Figure 5C:
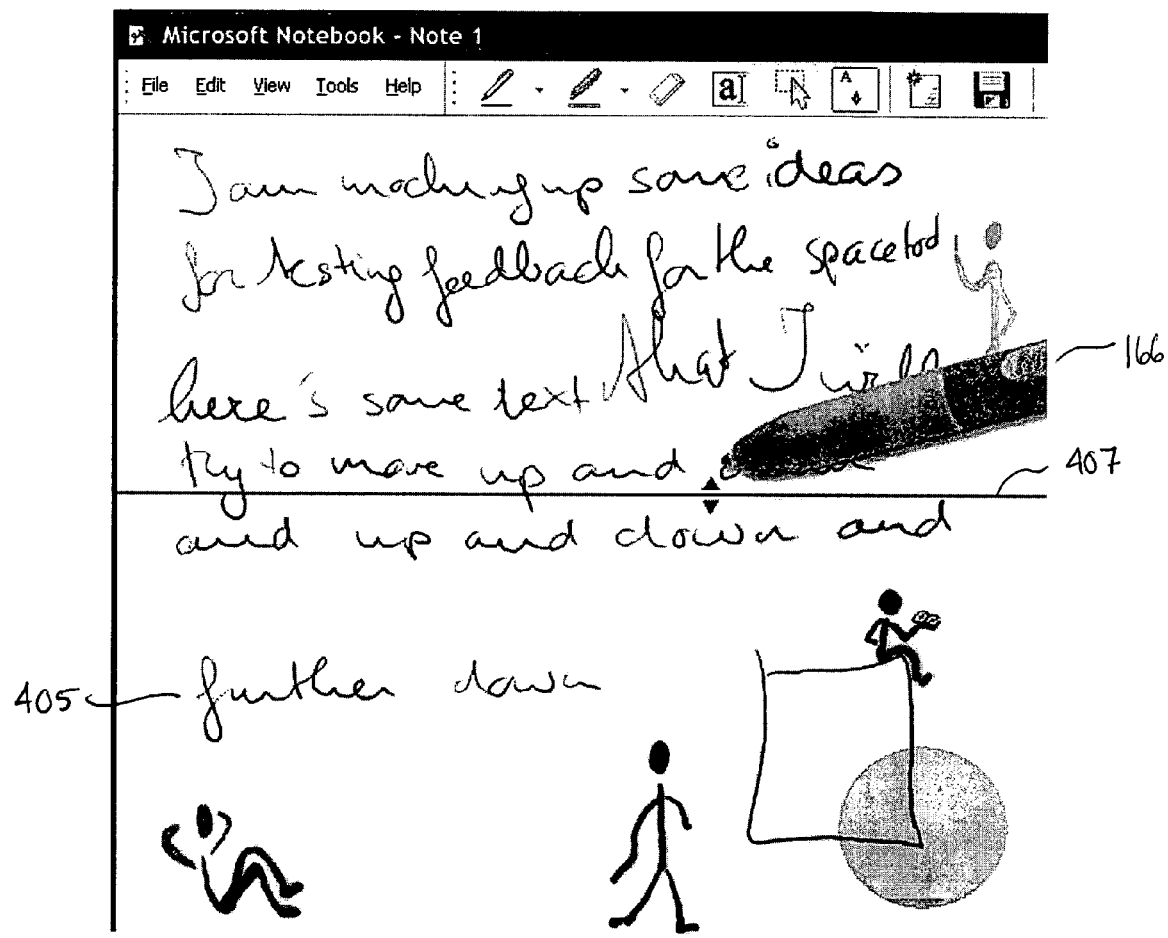
Figure 5D:
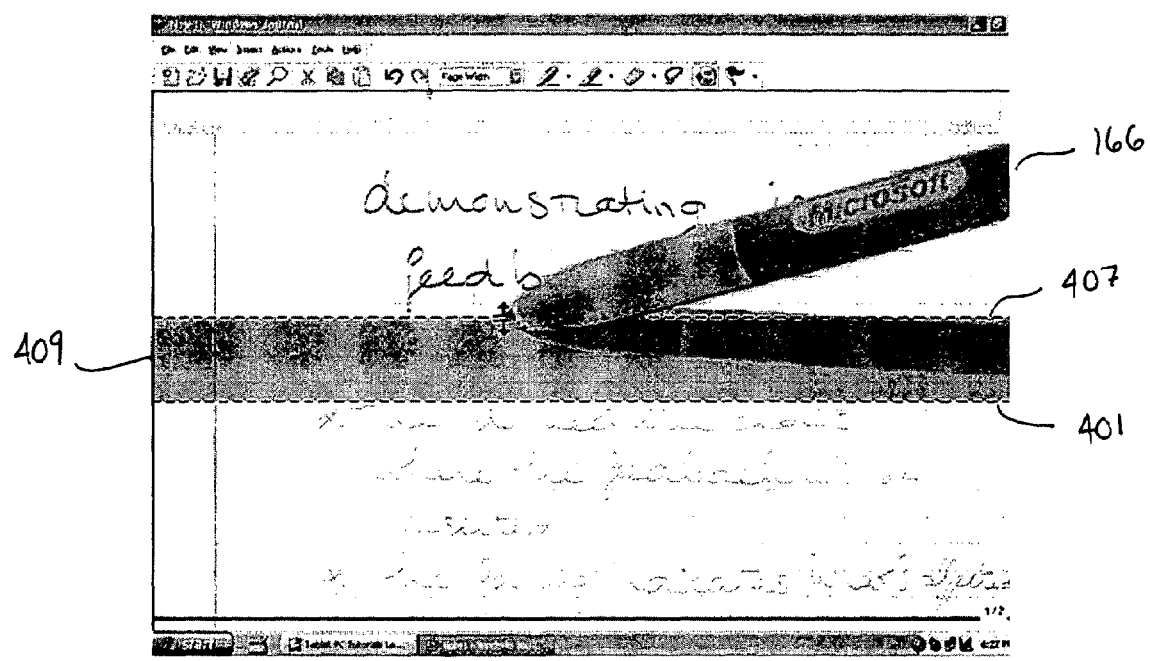
Figure 6B:
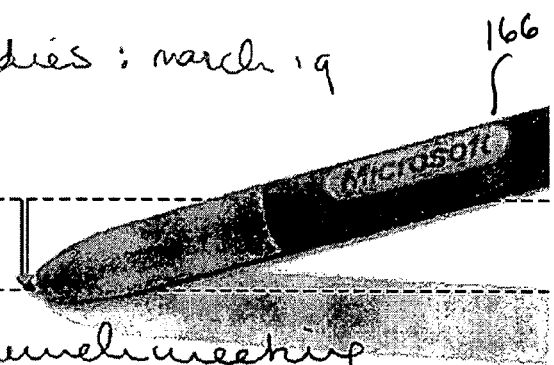
Figure 7:
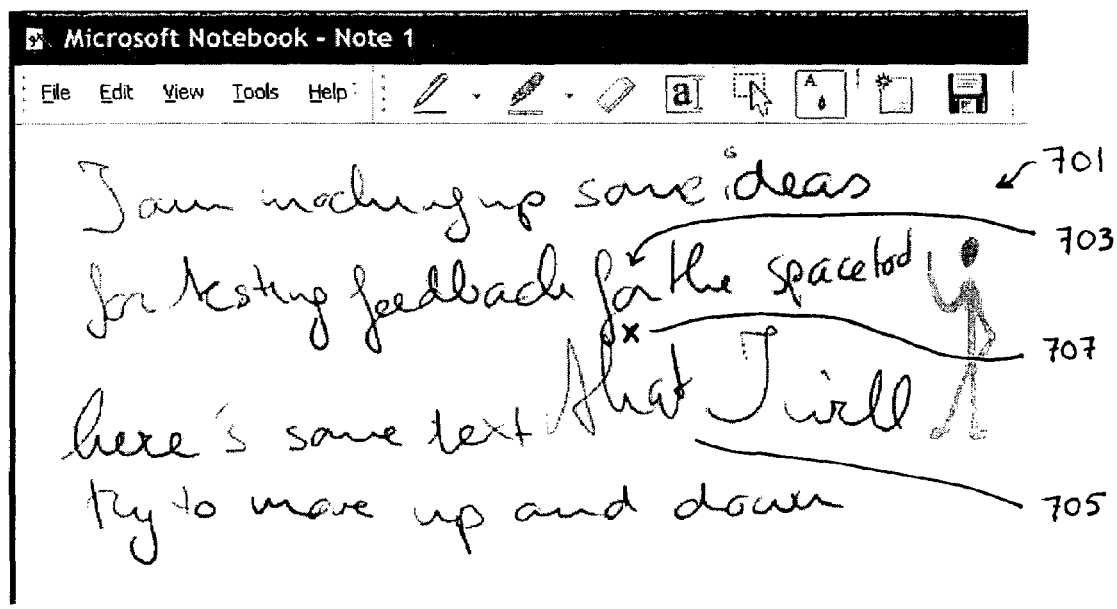
FIG. 7 shows a sample of handwritten text into which a user may desire to insert space.

As a result, in step 323, the object appearance control module 211 changes the appearance of the space 409 between the first cursor line 401 and the second cursor line 407, as shown in FIG. 5B. For example, as illustrated in this figure, the space 409 between the first cursor line 401 and the second cursor line 407 may be given a gray shading. It should be noted, however, that other techniques for distinguishing the space 409 also can be employed. For example, the object appearance control module 211 may change the color of the space 409 rather than giving it gray color. In FIG. 5B, the appearance of the objects below the first threshold position is not changed, in order to emphasize the change in appearance given to the space 409. When the space tool 201 is actually employed, however, the objects below the threshold position also change appearance to indicate that these objects will move when space is deleted from the document, as illustrated in FIG. 5D.

With some embodiments of the invention, the space tool 201 can only be employed to delete empty space. For example, the pointer position detection module 203 may not provide a new pointer position that would place an object between the new pointer position and the original pointer position, regardless of the actual position of the pen 166. Alternatively, the threshold position determination module 205 may not determine a second threshold position that would place an object between the first threshold position and the second threshold position, regardless of the pointer position determined by the pointer position detection module 203.

In step 325, the pointer position detection module 203 determines whether the pen 166 has been lifted from the surface of the digitizer 165. If the pen 166 has not been lifted from the surface of the digitizer 165, then the space tool 201 concludes that the user has not completed the deletion process, and loops back to step 313. If, on the other hand, the pen 166 has been lifted from the surface of the digitizer 165, then the space tool 201 determines that the user has concluded the deletion process. Accordingly, in step 327, the space insertion/deletion module 209 deletes the space between the first threshold position and the second threshold position. If the space tool 201 is operating in the "snap-to" mode, then the space insertion/deletion module 209 may round up or round down the amount of space being deleted, in order to ensure that the boundary of the deleted space matches a stationary line. The space insertion/deletion module 209 also moves the objects identified by the object appearance control module 211 to their new location, filling the gap left by the deleted space, as shown in FIG. 5C.

It should be noted that, in the illustrated embodiments, the space tool 201 inserts or deletes space across the entire width of the document. With some applications, however, the space tool 201 may insert space into or delete space from only segments of a document. For example, if the document contains two lists arranged in side-by-side columns, the user may wish to add space to one column without adding space to the other column. With some embodiments of the invention, the user may select only one segment in which the tool 201 will insert or delete space using a conventional selection technique. With alternate embodiments of the invention, however, the tool 201 may insert or delete space in only one segment of a document if the user simply places the pen 166 in that segment. The tool 201 would then insert or delete space in the entire document if the user placed the pen 166 outside of any specific segment of the document (in, for example, the margin of the document). If the space tool 201 is employed to insert or delete space for only a segment of a document, then the cursor lines 401 and 407 may be drawn to extend across only the affected segment, rather than the entire width of the document.

It should also be noted that, with some embodiments of the invention, the tool 201 may insert or delete space such that objects both above and below the inserted or deleted space are moved. For these embodiments, the tool 201 may change the appearance of the moved objects, using one technique to change the appearance of those objects above the threshold positions, and a different technique to change the appearance of those objects below the threshold positions. For example, the space tool 201 may fade the objects above the threshold positions, and bold the objects below the threshold positions.

Still further, some embodiments of the invention may change the appearance of only those objects that will be moved when space is inserted. More particularly, various embodiments of the invention may only provide the user with feedback for a space insertion operation. Alternatively, various embodiments of the invention may change the appearance of only those objects that will be moved when space is deleted. That is, these embodiments may only provide the user with feedback for a space deletion operation.

It should also be noted that, the above discussion of various embodiments of the space tool 201 have been directed primarily to the vertical insertion or deletion of space in a document in order to convey a better understanding of the invention. Various embodiments of the invention, however will additionally or alternatively allow a user to insert space in a vertical direction. As with the embodiments described above, these embodiments of the space tool 201 will likewise change the appearance of the objects that will be moved when space is inserted or deleted.

For example, the space tool 201 may insert space between a left threshold position and a right threshold position, or delete space from between a left threshold position and a right threshold position. If space is inserted or deleted such that objects to the right of the threshold positions are moved, then the tool 201 will change the appearance of those objects as described in detail above. Similarly, if the tool 201 inserts or deletes space such that objects to the left of the threshold positions are moved, then the tool 201 will change the appearance of those objects as described in detail above. With some embodiments of the invention, the tool 201 may insert or delete space such that objects on both sides of the inserted or deleted space are moved. For these embodiments, the tool 201 may change the appearance of objects on both sides of the threshold positions with different techniques, so that the objects are distinguished. For example, the space tool 201 may fade the objects to the left of the threshold positions, and bold the objects on the right of the threshold positions.

Still further, while the insertion and deletion of space has been described as horizontal or vertical with reference to the display of the computer, still other embodiments of the space tool 201 may allow a user to vertically or horizontally insert or delete space relative to the direction of the objects within a document. For example, if a document contains handwritten text in electronic ink, the direction of the lines in that text may be at an angle to the display. In this situation, the space tool 201 may allow a user to insert or delete space along a direction corresponding to the angle of the text. Further, the space tool 201 will determine which objects will move with the insertion or deletion of space based upon the angle of the text and the corresponding angle of the inserted or deleted space.

Moreover, with various embodiments of the space tool 201, a user may insert space having specific boundaries in several directions. For example, some embodiments may allow a user to define the amount and location of space to be inserted or deleted using a lasso tool that draws a freeform shape, or a rectangle tool that draws a rectangle shape according to dimension selected by the user. With these embodiments, the space tool 201 may select multiple threshold positions to define the amount and location of inserted or deleted space. Moreover, the space tool 201 may determine that objects will be moved both vertically and horizontally (or at one or more other angles) when the defined space is inserted or deleted. With these embodiments, the space tool 201 may use different techniques for distinguishing objects that will be moved in different directions. For example, the space tool 201 may fade the objects directly to the left of the threshold positions, bold the objects direction to the right of the threshold positions, and change the color of objects below the threshold positions. Of course, still other variations of the space tool described herein will be apparent from the foregoing description.

CONCLUSION

Although the invention has been defined using the appended claims, these claims are exemplary in that the invention may include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

What is claimed is:

1. A computer-implemented method of deleting space from a document presented on a display, comprising:
    determining a first threshold position in the document based on a first user input;
    determining a second threshold position on a first side of the first threshold position based on a second user input;
    responsive to the second user input, changing a displayed visual appearance only of objects located on a second side of the first threshold position opposite the first side without changing a position of the objects and without deleting any space, wherein changing the displayed visual appearance visually identifies those objects which will be moved when space is deleted from the document; and
    deleting space between the first threshold position and the second threshold position.

2. The method recited in claim 1, further comprising shading or changing the color of the space between the first threshold position and the second threshold position before the space is deleted.

3. The method recited in claim 1, wherein the first user input identifies a pointer position in the document.

4. The method recited in claim 3, wherein the first threshold position corresponds to the pointer position.

5. The method recited in claim 3, wherein the document includes lines spaced apart according to a line height, and
    wherein determining the first threshold position includes calculating the line height between adjacent lines and locating the first threshold position at a predetermined distance from the pointer position based on the line height.

6. The method recited in claim 5, wherein the distance equals ½ the line height.

7. The method recited in claim 5, further comprising providing a first cursor at the pointer position.

8. The method recited in claim 1, further comprising providing a first cursor at the first threshold position.

9. The method recited in claim 8, wherein the first cursor is a line extending across at least a segment of the document.

10. The method recited in claim 8, further comprising providing a second cursor at the second threshold position.

11. The method recited in claim 10, wherein the second cursor is a line extending across the at least a segment of the document.

12. The method recited in claim 1, wherein a line extending across the document intersects two adjacent segments, and space is deleted in only one of the two segments of the document, the space being deleted in a direction parallel to the line.

13. The method recited in claim 1, wherein an object is located on the second side of the first threshold position if a percentage of the object is located on the second side of the first threshold position.

14. The method recited in claim 13, wherein an object is located on the second side of the first threshold position only if greater than fifty percent of the object is located on the second side of the first threshold position.

15. The method recited in claim 14, wherein an object is located on the second side of the first threshold position only if sixty percent or more of the object is located on the second side of the first threshold position.

16. The method recited in claim 15, wherein an object is located on the second side of the first threshold position only if eighty percent or more of the object is located on the second side of the first threshold position.

17. The method recited in claim 16, wherein an object is located on the second side of the first threshold position only if ninety percent or more of the object is located on the second side of the first threshold position.

18. The method recited in claim 17, wherein an object is located on the second side of the first threshold position only if one hundred percent of the object is located on the second side of the first threshold position.

19. The method recited in claim 1, where the displayed visual appearance of each object located on the second side of the first threshold position is changed, without obscuring the object, by one of the group consisting of: changing a color of the object, graying the object, fading the object, changing a color of a bounding box of the object, graying a bounding box of the object, fading a bounding box of the object, and providing dashed lines for a bounding box of the object.

20. A space tool having computer executable components stored on one or more computer readable storage media, which when executed by a computer deletes space from a document presented on a display, comprising:
    a pointer position detection module that detects pointer positions in the document;

a threshold position determination module that determines a first threshold position based upon a first pointer position detected by the pointer position detection module and a second threshold position based upon a second pointer position detected by the pointer position detection module;

an object appearance control module that, in response to the threshold position determination module determining the first threshold position and the second threshold position, identifies objects located on a first side of the first threshold position and changes a displayed visual appearance only of the objects located on the first side of the first threshold position without changing a position of the objects and without deleting any space, wherein changing the displayed visual appearance visually identifies those objects which will be moved when space is deleted from the document; and a module that deletes space from a document between the first threshold position and the second threshold position, wherein the second threshold position is on a second side of the first threshold position opposite the first side.

21. The space tool recited in claim 20, further comprising a cursor drawing module that draws a cursor in the document corresponding to the first threshold position.

22. The space tool recited in claim 21, wherein the cursor drawing module further draws a second cursor in the document corresponding to the second threshold position.

23. The space tool recited in claim 20, wherein the object appearance control module shades or changes the color of the space between the first threshold position and the second threshold position before the space is deleted by the space deletion module.

24. The space tool recited in claim 20, wherein the object appearance control module includes a parser for determining whether the appearance of an associated group of objects are changed together if one of the objects in the group is located on the first side of the threshold position.

25. Computer readable storage media having computer-executable instructions stored thereon for causing a computer to perform a method of deleting space from a document presented on a display comprising the steps of:

determining a first threshold position in the document based on a first user input;

determining a second threshold position on a first side of the first threshold position based on a second user input;

responsive to the second user input changing a displayed visual appearance only of objects located on the second side of the first threshold position opposite the first side without changing a position of the objects and without deleting any space, wherein changing the displayed visual appearance identifies those objects which will be moved when space is deleted from the document; and deleting space between the first threshold position and the second threshold position.

* * * * *